（12） United States Patent
John Wilson et al.

(10) Patent No.: US 11,438,833 B2
(45) Date of Patent: Sep. 6, 2022

(54) MULTI-TRANSMIT RECEIVE POINT CANDIDATE IDENTIFICATION

(71) Applicant: QUALCOMM Incorporated, San Diego, CA (US)

(72) Inventors: Makesh Pravin John Wilson, San Diego, CA (US); Tao Luo, San Diego, CA (US); Xiaoxia Zhang, San Diego, CA (US); Vinay Chande, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/716,138

(22) Filed: Dec. 16, 2019

(65) Prior Publication Data
US 2020/0196230 A1 Jun. 18, 2020

Related U.S. Application Data

(60) Provisional application No. 62/780,851, filed on Dec. 17, 2018.

(51) Int. Cl.
H04W 48/20 (2009.01)
H04W 24/10 (2009.01)
(Continued)

(52) U.S. Cl.
CPC ........... H04W 48/20 (2013.01); H04W 8/245 (2013.01); H04W 24/10 (2013.01); H04W 76/11 (2018.02); H04W 76/27 (2018.02)

(58) Field of Classification Search
CPC ..... H04W 24/10; H04W 28/00; H04W 48/16; H04W 48/17; H04W 48/20; H04W 76/11;
(Continued)

(56) References Cited

U.S. PATENT DOCUMENTS

2016/0338094 A1* 11/2016 Faurie .................. H04W 72/14
2018/0013481 A1* 1/2018 Guo ....................... H04B 7/086
(Continued)

FOREIGN PATENT DOCUMENTS

WO WO-2017173037 A1 10/2017
WO WO-2017196491 A1 11/2017
(Continued)

OTHER PUBLICATIONS

International Search Report and Written Opinion—PCT/US2019/066956—ISA/EPO—dated Mar. 24, 2020.

Primary Examiner — Jean A Gelin
(74) Attorney, Agent, or Firm — Holland & Hart LLP

(57) ABSTRACT

Methods, systems, and devices for multi-transmit receive point candidate identification are described. A base station may indicate, to a user equipment (UE), one or more measurements to be performed on multiple transmit receive points (TRPs) for determination of TRP candidates for communications between the UE and the base station. The UE may perform the measurements on each of the TRPs, and transmit a report to the base station that is based on the measurements. The report may be associated with the TRP candidates. The base station may select one or more of the TRP candidates for communications with the UE, and may indicate the selected TRP candidates to the UE.

29 Claims, 13 Drawing Sheets

(51) Int. Cl.
 *H04W 76/27* (2018.01)
 *H04W 76/11* (2018.01)
 *H04W 8/24* (2009.01)

(58) Field of Classification Search
 CPC ...... H04W 76/27; H04W 8/245; H04B 7/024; H04B 7/04; H04B 7/063
 See application file for complete search history.

(56) References Cited

U.S. PATENT DOCUMENTS

| | | | | |
|---|---|---|---|---|
| 2018/0020382 | A1* | 1/2018 | Kim | H04W 8/22 |
| 2018/0034515 | A1* | 2/2018 | Guo | H04B 7/043 |
| 2018/0048375 | A1* | 2/2018 | Guo | H04B 7/024 |
| 2018/0048442 | A1* | 2/2018 | Sang | H04L 5/0048 |
| 2018/0091212 | A1* | 3/2018 | Lee | H04L 5/0048 |
| 2018/0124673 | A1* | 5/2018 | Tenny | H04L 5/0091 |
| 2018/0199226 | A1* | 7/2018 | Tsai | H04W 24/10 |
| 2018/0199360 | A1* | 7/2018 | Lin | H04L 5/0082 |
| 2018/0302888 | A1* | 10/2018 | Stirling-Gallacher | H04B 7/088 |
| 2019/0021084 | A1* | 1/2019 | Stirling-Gallacher | H04W 72/048 |
| 2019/0229852 | A1* | 7/2019 | Li | H04L 5/0044 |
| 2019/0238208 | A1* | 8/2019 | Tang | H04W 24/10 |
| 2019/0260448 | A1* | 8/2019 | Rahman | H04L 5/0048 |
| 2019/0268782 | A1* | 8/2019 | Martin | H04W 36/0094 |
| 2019/0319686 | A1 | 10/2019 | Chen, IV et al. | |
| 2019/0342905 | A1* | 11/2019 | Ren | H04W 72/12 |
| 2019/0379506 | A1* | 12/2019 | Cheng | H04B 7/0695 |
| 2020/0007282 | A1* | 1/2020 | Yoon | H04W 88/08 |
| 2020/0037385 | A1* | 1/2020 | Park | H04B 7/0695 |
| 2020/0045655 | A1* | 2/2020 | Joseph | H04B 7/0617 |
| 2020/0067615 | A1* | 2/2020 | Ghanbarinejad | H04B 7/063 |
| 2020/0077320 | A1* | 3/2020 | Shimoda | H04W 36/0044 |
| 2020/0137745 | A1* | 4/2020 | Bachu | H04L 5/001 |
| 2020/0154467 | A1* | 5/2020 | Gong | H04W 24/08 |
| 2020/0305038 | A1* | 9/2020 | Tooher | H04W 74/0833 |
| 2020/0350972 | A1* | 11/2020 | Yi | H04W 72/1268 |
| 2021/0112586 | A1* | 4/2021 | Bhamri | H04W 72/1289 |
| 2021/0352629 | A1* | 11/2021 | Haghighat | H04W 72/0413 |

FOREIGN PATENT DOCUMENTS

| | | |
|---|---|---|
| WO | WO-2017197118 A1 | 11/2017 |
| WO | WO-2018017840 A1 | 1/2018 |
| WO | WO-2018169796 A1 | 9/2018 |

\* cited by examiner

MULTI-TRANSMIT RECEIVE POINT CANDIDATE IDENTIFICATION

CROSS REFERENCE

The present Application for Patent claims the benefit of U.S. Provisional Patent Application No. 62/780,851 by JOHN WILSON et al., entitled "MULTI-TRANSMIT RECEIVE POINT CANDIDATE IDENTIFICATION," filed Dec. 17, 2018, assigned to the assignee hereof, and expressly incorporated herein.

BACKGROUND

The following relates generally to wireless communications, and more specifically to multi-transmit receive point (TRP) candidate identification.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may be capable of communicating with a base station via multiple TRPs associated with the base station where the TRPs may be differentiated by an identifier. In some implementations, the process of identifying, or selecting one or more TRPs may be inefficient.

SUMMARY

The described techniques relate to improved methods, systems, devices, and apparatuses that support multi-transmit receive point (TRP) candidate identification. Generally, the described techniques provide for enabling a base station to efficiently select TRPs for multi-TRP communications with a user equipment (UE). The base station may select the TRPs based on, for example, measurements performed by the UE on TRPs associated with the base station. The base station may indicate, to the UE, the measurements to be performed by the UE.

A method of wireless communications at a UE is described. The method may include identifying one or more measurements to be performed by the UE for determination of TRP candidates for communications between the UE and a set of TRPs associated with one or more base stations, and performing, based on the identifying, the one or more measurements on each TRP of the set of TRPs associated with the one or more base stations. The method may include transmitting, to the one or more base stations, a report based on the one or more measurements, the report being associated with one or more TRP candidates of the set of TRPs for communication with the UE.

An apparatus for wireless communications at a UE is described. The apparatus may include a processor, memory coupled with the processor, and instructions stored in the memory. The instructions may be executable by the processor to cause the apparatus to identify one or more measurements to be performed by the UE for determination of TRP candidates for communications between the UE and a set of TRPs associated with one or more base stations, and perform, based on the identifying, the one or more measurements on each TRP of the set of TRPs associated with the one or more base stations. The instructions may be executable by the processor to cause the apparatus to transmit, to the one or more base stations, a report based on the one or more measurements, the report being associated with one or more TRP candidates of the set of TRPs for communication with the UE.

Another apparatus for wireless communications at a UE is described. The apparatus may include means for identifying one or more measurements to be performed by the UE for determination of TRP candidates for communications between the UE a set of TRPs associated with one or more base stations, and means for performing, based on the identifying, the one or more measurements on each TRP of the set of TRPs associated with the one or more base stations. The apparatus may include means for transmitting, to the one or more base stations, a report based on the one or more measurements, the report being associated with one or more TRP candidates of the set of TRPs for communication with the UE.

A non-transitory computer-readable medium storing code for wireless communications at a UE is described. The code may include instructions executable by a processor to identify one or more measurements to be performed by the UE for determination of TRP candidates for communications between the UE a set of TRPs associated with one or more base stations, and perform, based on the identifying, the one or more measurements on each TRP of the set of TRPs associated with the one or more base stations. The code may include instructions executable by the processor to transmit, to the one or more base stations, a report based on the one or more measurements, the report being associated with one or more TRP candidates of the set of TRPs for communication with the UE.

Some examples of the method, apparatuses, and non-transitory computer-readable medium described herein may further include operations, features, means, or instructions for identifying the one or more TRP candidates based on the one or more measurements.

In some examples of the method, apparatuses, and non-transitory computer-readable medium described herein, identifying the one or more TRP candidates based on the one or more measurements includes identifying the one or more TRP candidates based on one or more timings associated with the one or more TRPs.

In some examples of the method, apparatuses, and non-transitory computer-readable medium described herein, transmissions from the one or more TRP candidates are configured for simultaneous reception at the UE.

In some examples of the method, apparatuses, and non-transitory computer-readable medium described herein, identifying the one or more TRP candidates based on the one or more measurements includes identifying the one or more TRP candidates based on one or more timing differences between the one or more TRPs.

Some examples of the method, apparatuses, and non-transitory computer-readable medium described herein may further include operations, features, means, or instructions for determining a ranking associated with each TRP of the set of TRPs, where the one or more TRP candidates may be identified based on the ranking associated with each TRP. In some examples of the method, apparatuses, and non-transitory computer-readable medium described herein, determining the ranking associated with each TRP may include operations, features, means, or instructions for determining the ranking associated with each TRP based on the one or more measurements associated with each TRP. In some examples of the method, apparatuses, and non-transitory computer-readable medium described herein, determining the ranking associated with each TRP may include operations, features, means, or instructions for determining the ranking associated with each TRP based on a capability associated with each TRP.

Some examples of the method, apparatuses, and non-transitory computer-readable medium described herein may further include operations, features, means, or instructions for receiving, from the base station, an indication of a number of TRPs to identify as TRP candidates, where identifying the one or more TRP candidates includes identifying a first set of TRP candidates that includes the number of TRPs based on the ranking associated with each TRP.

In some examples of the method, apparatuses, and non-transitory computer-readable medium described herein, identifying the one or more TRP candidates may include operations, features, means, or instructions for identifying a second set of TRP candidates including the number of TRPs based on the ranking associated with each TRP.

In some examples of the method, apparatuses, and non-transitory computer-readable medium described herein, transmitting the report may include operations, features, means, or instructions for transmitting a list including the first set of TRP candidates and the second set of TRP candidates in an order based on the rankings associated with TRPs in the first set of TRP candidates and on the rankings associated with TRPs in the second set of TRP candidates.

In some examples of the method, apparatuses, and non-transitory computer-readable medium described herein, transmitting the report may include operations, features, means, or instructions for transmitting one or more respective device identifiers associated with the one or more TRP candidates.

In some examples of the method, apparatuses, and non-transitory computer-readable medium described herein, identifying the one or more measurements to be performed by the UE may include operations, features, means, or instructions for receiving an indication of the one or more measurements via radio resource control (RRC) signaling.

In some examples of the method, apparatuses, and non-transitory computer-readable medium described herein, identifying the one or more measurements to be performed by the UE may include operations, features, means, or instructions for receiving an indication of the one or more measurements via a control message.

In some examples of the method, apparatuses, and non-transitory computer-readable medium described herein, performing the one or more measurements on each TRP may include operations, features, means, or instructions for performing an L3 measurement on each TRP. In some examples of the method, apparatuses, and non-transitory computer-readable medium described herein, performing the one or more measurements on each TRP may include operations, features, means, or instructions for performing an L1 measurement on each TRP.

Some examples of the method, apparatuses, and non-transitory computer-readable medium described herein may further include operations, features, means, or instructions for receiving, from the base station, an indication of the set of TRPs associated with the base station.

Some examples of the method, apparatuses, and non-transitory computer-readable medium described herein may further include operations, features, means, or instructions for receiving, from the base station, a TRP indication indicating one or more selected TRPs of the one or more TRP candidates after transmitting the report.

In some examples of the method, apparatuses, and non-transitory computer-readable medium described herein, receiving the TRP indication may include operations, features, means, or instructions for receiving one or more respective device identifiers associated with the one or more selected TRPs.

In some examples of the method, apparatuses, and non-transitory computer-readable medium described herein, receiving the TRP indication may include operations, features, means, or instructions for receiving an indication of the one or more selected TRPs implicitly via a control resource set (CORESET) identifier or via a transmission configuration information (TCI) state.

Some examples of the method, apparatuses, and non-transitory computer-readable medium described herein may further include operations, features, means, or instructions for receiving, from the base station, a signal via at least one TRP of the one or more TRP candidates after transmitting the report.

In some examples of the method, apparatuses, and non-transitory computer-readable medium described herein, all TRPs of the set of TRPs may be configured to communicate on a same carrier frequency.

A method of wireless communications at a base station is described. The method may include transmitting, to a UE, an indication of one or more measurements to be performed by the UE for communications between the UE and the base station, and receiving, from the UE, a report based on the one or more measurements performed by the UE, the report being associated with one or more TRP candidates of a set of TRPs for communication with the UE. The method may include selecting, based on the report, a TRP of the one or more TRP candidates for communication with the UE, and transmitting, to the UE, a TRP indication indicating the selected TRP for communication with the UE.

An apparatus for wireless communications at a base station is described. The apparatus may include a processor, memory coupled with the processor, and instructions stored in the memory. The instructions may be executable by the processor to cause the apparatus to transmit, to a UE, an indication of one or more measurements to be performed by the UE for communications between the UE and the base station, and receive, from the UE, a report based on the one or more measurements performed by the UE, the report being associated with one or more TRP candidates of a set of TRPs for communication with the UE. The instructions may be executable by the processor to cause the apparatus to select, based on the report, a TRP of the one or more TRP candidates for communication with the UE, and transmit, to the UE, a TRP indication indicating the selected TRP for communication with the UE.

Another apparatus for wireless communications at a base station is described. The apparatus may include means for transmitting, to a UE, an indication of one or more measurements to be performed by the UE for communications between the UE and the base station, and means for receiving, from the UE, a report based on the one or more measurements performed by the UE, the report being associated with one or more TRP candidates of a set of TRPs for communication with the UE. The apparatus may include means for selecting, based on the report, a TRP of the one or more TRP candidates for communication with the UE, and means for transmitting, to the UE, a TRP indication indicating the selected TRP for communication with the UE.

A non-transitory computer-readable medium storing code for wireless communications at a base station is described. The code may include instructions executable by a processor to transmit, to a UE, an indication of one or more measurements to be performed by the UE for communications between the UE and the base station, and receive, from the UE, a report based on the one or more measurements performed by the UE, the report being associated with one or more TRP candidates of a set of TRPs for communication with the UE. The code may include instructions executable by a processor to select, based on the report, a TRP of the one or more TRP candidates for communication with the UE, and transmit, to the UE, a TRP indication indicating the selected TRP for communication with the UE.

In some examples of the method, apparatuses, and non-transitory computer-readable medium described herein, the operations, features, means, or instructions for selecting one or more TRP candidates may include operations, features, means, or instructions for selecting at least two of the two or more TRP candidates based on the report, where the TRP indication indicates the at least two selected TRPs for communication with the UE.

In some examples of the method, apparatuses, and non-transitory computer-readable medium described herein, the operations, features, means, or instructions receiving the report may include operations, features, means, or instructions for receiving a ranking for each TRP of the one or more TRP candidates, and where selecting the TRP for communication with the UE includes selecting the TRP based on the ranking associated with each TRP of the one or more TRPs.

Some examples of the method, apparatuses, and non-transitory computer-readable medium described herein may further include operations, features, means, or instructions for transmitting, to the UE, an indication of the set of TRPs on which the one or more measurements are to be performed.

Some examples of the method, apparatuses, and non-transitory computer-readable medium described herein may further include operations, features, means, or instructions for transmitting, to the UE, an indication of a number of TRPs to identify as TRP candidates, where the one or more TRP candidates includes the number of TRP candidates.

In some examples of the method, apparatuses, and non-transitory computer-readable medium described herein, the operations, features, means, or instructions for transmitting the indication of the one or more measurements may include operations, features, means, or instructions for transmitting an indication of a timing measurement.

In some examples of the method, apparatuses, and non-transitory computer-readable medium described herein, the operations, features, means, or instructions for transmitting the indication of the one or more measurements may include operations, features, means, or instructions for transmitting an indication of a signal quality measurement.

In some examples of the method, apparatuses, and non-transitory computer-readable medium described herein, the operations, features, means, or instructions for transmitting the indication of the one or more measurements may include operations, features, means, or instructions for transmitting an indication of a TRP capability.

In some examples of the method, apparatuses, and non-transitory computer-readable medium described herein, the operations, features, means, or instructions for transmitting the indication of the one or more measurements may include operations, features, means, or instructions for transmitting the indication of the one or more measurements via RRC signaling.

In some examples of the method, apparatuses, and non-transitory computer-readable medium described herein, the operations, features, means, or instructions for transmitting the indication of the one or more measurements may include operations, features, means, or instructions for transmitting the indication of the one or more measurements via a control message.

In some examples of the method, apparatuses, and non-transitory computer-readable medium described herein, all TRPs of the set of TRPs may be configured to communicate on a same carrier frequency.

DETAILED DESCRIPTION

Figure 1:
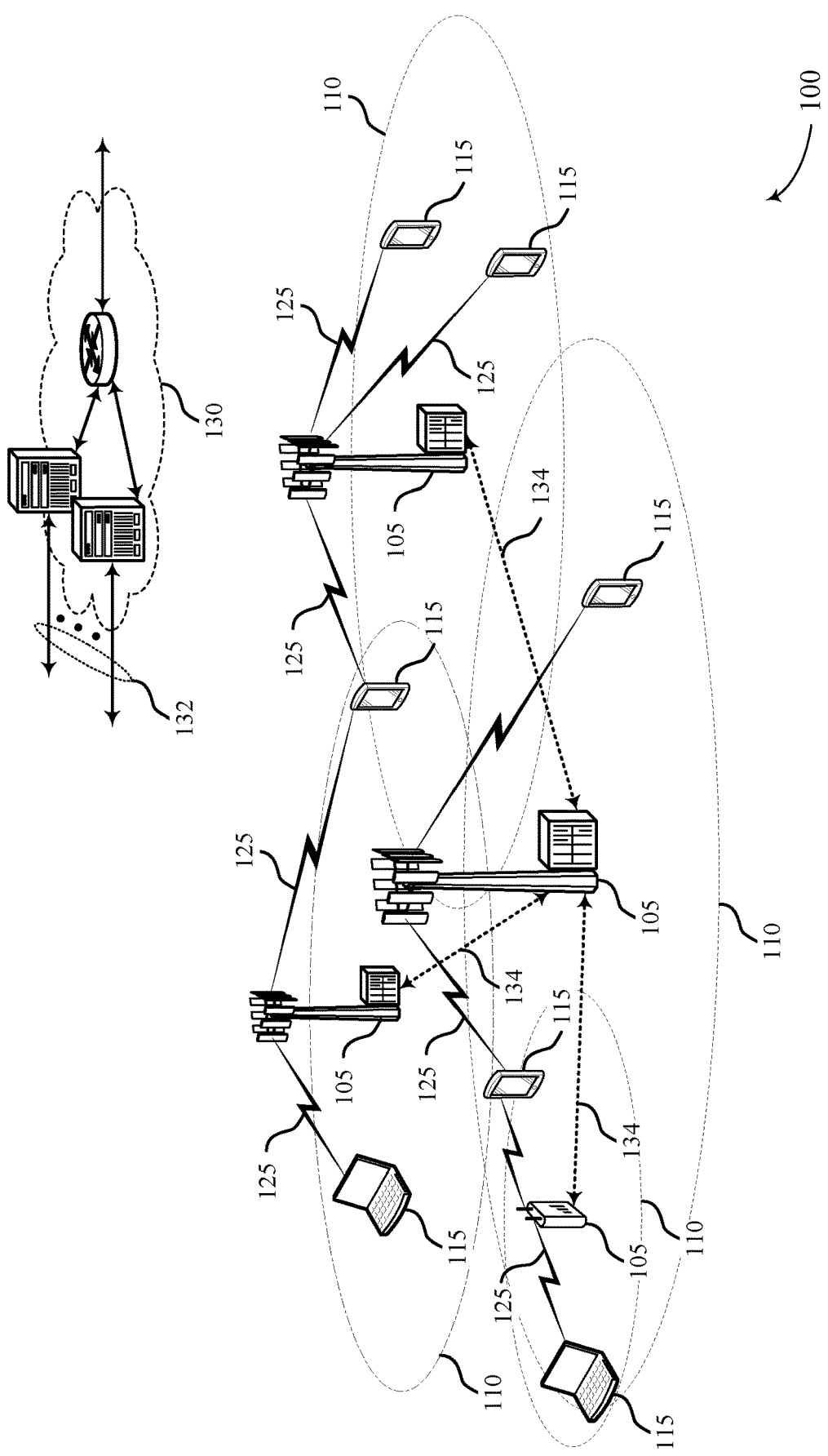
FIG. 1 illustrates an example of a system for wireless communications that supports multi-transmit receive point (TRP) candidate identification in accordance with aspects of the present disclosure.

The described techniques relate to improved methods, systems, devices, or apparatuses that support multi-transmit receive point (TRP) candidate identification. A base station may be associated with a set of TRPs that may be used for multi-TRP communications with a user equipment (UE). Generally, the described techniques enable a UE to identify, based on various criteria, particular TRP candidates within the set of TRPs that may be used for communications between the UE and a base station. For example, the UE may identify one or more TRPs that may be used for simultaneous reception at the UE. The UE may transmit a report associated with the identified TRP candidates to the base station, and the base station may then select one or more of the TRP candidates for communication with the UE. The base station may notify the UE of the selected TRPs either explicitly (e.g., via radio resource control (RRC) signaling) or implicitly (e.g., via a control resource set (CORESET) identifier or a transmission configuration information (TCI) state).

In some cases, the UE may identify TRP candidates by performing one or more measurements on multiple TRPs and identifying the TRP candidates based on the results of the measurements. For example, the UE may perform measurements related to signal quality, signal timing, or other characteristics, and may identify TRP candidates based on the results of the measurements. The report transmitted from the UE to the base station may be based on the measurements. For example, the report may indicate one or more TRP candidates based on the measurements. In some cases, the base station may transmit, to the UE, an indication of the measurements to be performed by the UE.

In some cases, a UE may determine a ranking for each TRP based on the results of the measurements, and possibly on various capabilities of each TRP. The UE may then identify the TRP candidates based on the rankings.

In some cases, the base station may indicate how many TRPs (e.g., a number of TRPs) the UE should identify as TRP candidates. The UE may then identify the specified number of TRP candidates by, for example, identifying the top n TRPs based on the rankings associated with the TRPs, where n is the number of TRP candidates specified by the base station.

Beneficially, such an approach may provide a UE and/or a base station with an efficient mechanism for identifying and selecting specific TRPs within a set of TRPs associated with the base station. Such an approach may enable selection of TRPs that may provide better signal quality, better services, and/or better timing characteristics (for example) for communications between a UE and a base station operating in a multi-TRP environment.

Aspects of the disclosure are initially described in the context of a wireless communications system. Aspects of the disclosure are further described in the context of a multi-TRP wireless communications systems, along with a process flow that supports multi-TRP candidate identification. Aspects of the disclosure are further illustrated by and described with reference to apparatus diagrams, system diagrams, and flowcharts that relate to multi-TRP candidate identification.

FIG. 1 illustrates an example of a wireless communications system 100 that supports multi-TRP candidate identification in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. A TRP may generally include any number of devices or components that are used for transmission and reception of wireless communications. In some examples, a TRP may refer to aspects of an eNB, a base station, a NodeB, a radio head, a smart radio head, a remote radio head, or one or more access points. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals (SSs), reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as SSs, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio (SNR), or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., SNR conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., SSs or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may identify one or more measurements to be performed by the UE for determination of TRP candidates for communications between the UE 115 and a set of TRPs associated with one or more base stations 105. The UE 115 may perform the measurements on each TRP of the set of TRPs, and may transmit a report to the one or more base stations 105. The report may be associated with one or more TRP candidates. For example, the report may indicate one or more TRP candidates whose transmissions may be jointly (e.g., simultaneously) received at the UE. The base station 105 may receive the report from the UE 115, and may select, based on the report, one or more TRPs of the TRP candidates for communications with the UE 115. The base station 105 may transmit an indication of the selected TRP(s) to the UE 115.

One or more of the UEs 115 may include a UE communication manager, which may identify one or more measurements to be performed by the UE for determination of TRP candidates for communications between the UE 115 and a set of TRPs associated with one or more base stations 105. The UE communications manager may perform, based on the identifying, the one or more measurements on each TRP of the set of TRPs associated with the one or more base stations 105. The UE communications manager may transmit, to the one or more base stations 105, a report based on the one or more measurements. The report may be associated with one or more TRP candidates of the set of TRPs for communication with the UE.

One or more of the base stations 105 may include a base station communication manager, which may transmit an indication of one or more measurements to be performed by a UE 115 for communications between base station 105 and UE 115. The base station communication manager may receive, from UE 115, a report that is based on the measurements performed by the UE 115. The report may be associated with one or more TRP candidates. The base station communications manager may select one or more of the TRP candidates for communications with UE 115. The base station communications manager may transmit, to UE 115, a TRP indication that indicates the selected TRP(s).

Figure 2:
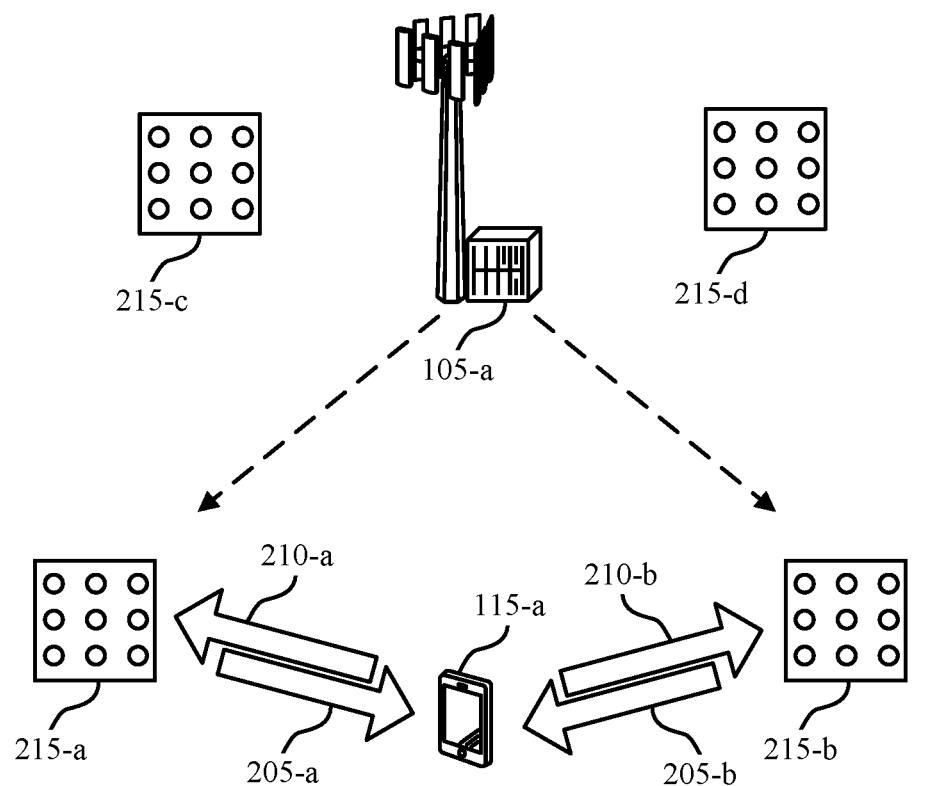
FIG. 2 illustrates an example of a wireless communication system that supports multi-TRP candidate identification in accordance with aspects of the present disclosure.

FIG. 2 illustrates an example of a wireless communication system 200 that may support multi-TRP candidate identification in accordance with aspects of the present disclosure. In some examples, wireless communication system 200 may implement aspects of wireless communication system 100. Wireless communication system 200 may be an example of a multi-TRP communication system.

Base station 105-a may include or may be associated with a set of TRPs 215 (e.g., a set of TRPs including TRP 215-a, TRP 215-b, TRP 215-c, and TRP 215-d), and may be capable of communicating with UE 115-a via TRPs 215 in the set. In some cases, the TRPs 215 may be associated with a different cell identifier, or may be associated with the same cell identifier but located in different places or panels. In some cases, all TRPs associated with a base station 105-a may be configured to operate on the same carrier frequency.

Base station 105-a may transmit downlink messages or signals (e.g., physical downlink control channel (PDCCH) and/or physical downlink shared channel (PDSCH) messages or signals) to UE 115-a using one or more selected TRPs 215 (e.g., TRPs 215-a, and 215-b) via corresponding downlink connections 205 (e.g., downlink connections 205-a, and 205-b), and UE 115-a may transmit uplink messages or signals (e.g., physical uplink control channel (PUCCH) and/or physical uplink shared channel (PUSCH) messages or signals) to base station 105 via one or more selected TRPs 215 on corresponding uplink connections 210 (e.g., uplink connections 210-a, and 210-b).

In some cases, each TRP 215 may be associated with a device identifier that identifies the TRP 215. In some cases, the device identifier may be a unique device identifier within a set of TRPs associated with a particular base station 105-*a* (but may not be unique with respect to TRPs associated with other base stations 105). In some cases, the device identifier may be a unique device identifier across sets of TRPs associated multiple base stations 105.

In some cases, base station 105-*a* may select TRPs 215 for communications with UE 115-*a* based on a report received from UE 115-*a*. For example, base station 105 may transmit an indication of one or more measurements to be performed by UE 115-*a* on each TRP 215 in the set of TRPs 215. Base station 105-*a* may transmit the indication of the measurements via RRC/MAC control element signaling, for example. UE 115-*a* may perform the indicated measurements on each TRP 215, and may transmit, to base station 105-*a*, a report that is based on the measurements. The report may be associated with one or more TRP candidates of the set of TRPs, which may be candidates for use in communications between base station 105-*a* and UE 115-*a*. In some cases, the TRP candidates indicated in the report may be suitable for joint (e.g., simultaneous) communications with the UE 115. For example, the report may include the measurements associated with the TRP candidates, and/or may include an explicit indication of the TRP candidates, such as the device identifiers associated with the TRP candidates.

In some cases, UE 115-*a* may identify the TRP candidates based on the measurements performed on the TRPs. In some cases, the report may exclude measurements and/or device identifiers associated with TRPs 215 in the set of TRPs that have not been identified as TRP candidates. For example, the UE 115 may indicate the measurements of the TRP candidates suitable for joint transmission. For example, UE 115-*a* may indicate the reference signal received power (RSRP) measurements of one or more TRPs 215 that may be suitable for joint reception at UE 115-*a*.

Base station 105-*a* may receive the report from UE 115-*a* associated with the TRP candidates, and may select one or more of the TRP candidates for communications with UE 115-*a*. Base station 105-*a* may transmit a TRP indication that indicates the selected TRP(s) to UE 115-*a*. Base station 105-*a* and UE 115-*a* may then begin communicating via the selected TRP(s).

In some cases, the measurements to be performed by UE 115-*a* on each TRP may include measurements related to signal quality or other signal characteristics associated with communications with the TRP. For example, the signal quality measurements may include signal strength measurements, SNR measurements, signal-to-interference-plus-noise ratio (SINR) measurements, RSRP measurements, signal frequency, intermediate frequency (IF). For example, UE 115-*a* may measure SS-RSRP, SS-reference signal received quality (RSRQ), SS-SINR, channel state information (CSI)-RSRP, CSI-RSRQ, or CSI-SINR, or a combination thereof.

In some cases, for communications based on the same modulation coding scheme (MCS), it may be desirable to for base station 105-*a* and UE 115-*a* to communicate using TRPs having similar strength for (for example) 64 quadrature amplitude modulation (QAM). In some cases, UE 115-*a* may identify TRP candidates (such as pairs of TRP candidates) by identifying TRPs having similar signal strength for 64 QAM, or for other types of modulation. In some cases, two TRPs may have similar signal strength (e.g., for a particular modulation scheme) if the signal strength for both TRPs is within a particular percentage or range of each other, for example.

In some cases, the measurements to be performed by UE 115-*a* may include measurements related to signal timings associated with communications with a TRP. In some cases, it may be desirable for base station 105-*a* and UE 115-*a* communicate using TRPs having similar signal timing, to improve the signal quality and synchronization. In some cases, UE 115-*a* may determine a timing difference between two TRPs in the set of TRPs, and may identify pairs of TRP candidates based on the timing difference between pairs of TRPs. In some cases, the indication of measurements to be performed by UE 115-*a* may include an indication of a timing difference limitation; e.g., a maximum timing difference between TRPs. In this case, UE 115-*a* may identify pairs of TRPs as TRP candidates by identifying pairs of TRPs having a timing difference that meets the indicated timing difference limitation (e.g., is less than the timing difference limitation). In some cases, the timing differences may be small (e.g., within a cyclic prefix (CP)).

In some cases, a UE 115-*a* may measure signal quality and/or signal timings for each TRP based on one or more reference signals received from each TRP, for example.

In some cases, the measurements to be performed by UE 115-*a* may include L3 measurements, which may be measurements associated with layer 3 (e.g., a communication layer associated with RRC signaling). L3 measurements may include measuring a reference signal in an RLC message and may filter across a duration of (for example) 20-40 ms. Thus, an L3 measurement may reflect a longer-term signal behavior or quality. In some cases, the use of L3 measurements may provide compatibility with earlier communications systems.

In some cases, the measurements to be performed by UE 115-*a* may include L1 measurements, which may be measurements associated with layer 1 (e.g., a physical communications layer). In some cases, L1 measurements may be quicker than L3 measurements, and may have lower latency than L3 measurements. For example, L1 measurements may use 4-5 slots in a PUCCH transmission, and may provide more timely channel quality indication (CQI) information than L3 measurements.

In some cases, the UE 115-*a* may identify the TRP candidates based on the measurements. For example, UE 115-*a* may identify TRP candidates based on the signal quality associated with the TRPs, or based on the timing associated with the TRPs, or based on a timing difference between TRPs. In some cases, for example, a UE 115 may indicate an L1-RSRP measurement for a first TRP 215 and an L1-RSRP measurement for a second TRP 215, and may indicate the two L1-RSRP measurements are suitable for joint reception.

In some cases, UE 115-*a* may determine a ranking associated with each TRP, and may identify TRP candidates based on the rankings. For example, UE 115-*a* may determine a ranking for each TRP 215 based on the measurement(s) for each TRP 215.

In some cases, a UE 115-*a* may determine a ranking associated with each TRP 215 based on a capability (e.g., a service) of the TRP, such as an ultra-reliable low latency communications (URLLC) capability, a broadcast capability such as a multimedia broadcast multicast service (MBMS), a positioning service (e.g., a service related to determining a position or location of UE 115-*a*), a capability to support different priority classes, and/or other capabilities. UE 115-*a* may determine whether a TRP 215 supports the capability by, for example, receiving an indication from the TRP 215 of whether the TRP 215 supports the capability. Thus, in some cases, if some TRPs 215 advertise capabilities (such as URLLC), the UE 115-*a* may use this information to rank (e.g., prioritize) TRPs 215. In some cases, the UE 115-*a* may determine the ranking for each TRP 215 based on a combination of measurements and capabilities associated with each TRP 215.

In some cases, UE 115-*a* may determine the ranking associated with each TRP 215 based on priority rules that may specify which measurements are most important. The priority rules may be configured (e.g., signaled to UE 115-*a*) by the base station 105-*a*, for example.

In some cases, a base station 105-*a* may support multi-TRP communications for a subset of the TRPs 215 associated with the base station 105-*a*; that is, not all TRPs 215 associated with a base station 105-*a* may be available or configured for multi-TRP communications. Thus, base station 105-*a* may transmit, to UE 115-*a*, an indication of the subset of TRPs on which the measurements are to be performed, and the UE 115-*a* may perform the measurements on that subset of TRPs 215 (without performing the measurements on the remaining TRPs in the set), or may perform the measurements on all of the TRPs 215 associated with base station 105-*a* but may identify and/or report the TRP candidates from the subset of TRPs 215.

In some cases, base station 105-*a* may transmit an indication, to UE 115-*a*, of a number n of TRP candidates to report. In this case, UE 115-*a* may select the top n TRPs 215 to report as TRP candidates based on the rankings associated with the TRPs 215, for example.

In some cases, a UE 115-*a* may report a list of TRP tuples in descending order of preference (e.g., ranking) for multi-TRP transmission. For example, UE 115-*a* may report multiple pairs of TRP candidates in descending order of preference based on rankings associated with each pair of TRP candidates. In this case, base station 105-*a* may select, based on the report received from UE 115-*a*, one or more of the pairs of TRP candidates for communications with UE 115-*a*.

After selecting one or more TRPs for communications with UE 115-*a*, base station 105-*a* may transmit a TRP indication to UE 115-*a* that indicates the selected TRPs. In some cases, the TRP indication may include an explicit indication of the selected TRPs, such as device identifiers associated with the selected TRPs. In some cases, the TRP indication may be implicitly signaled, such as via a CORESET identifier or a TCI state.

Figure 3:
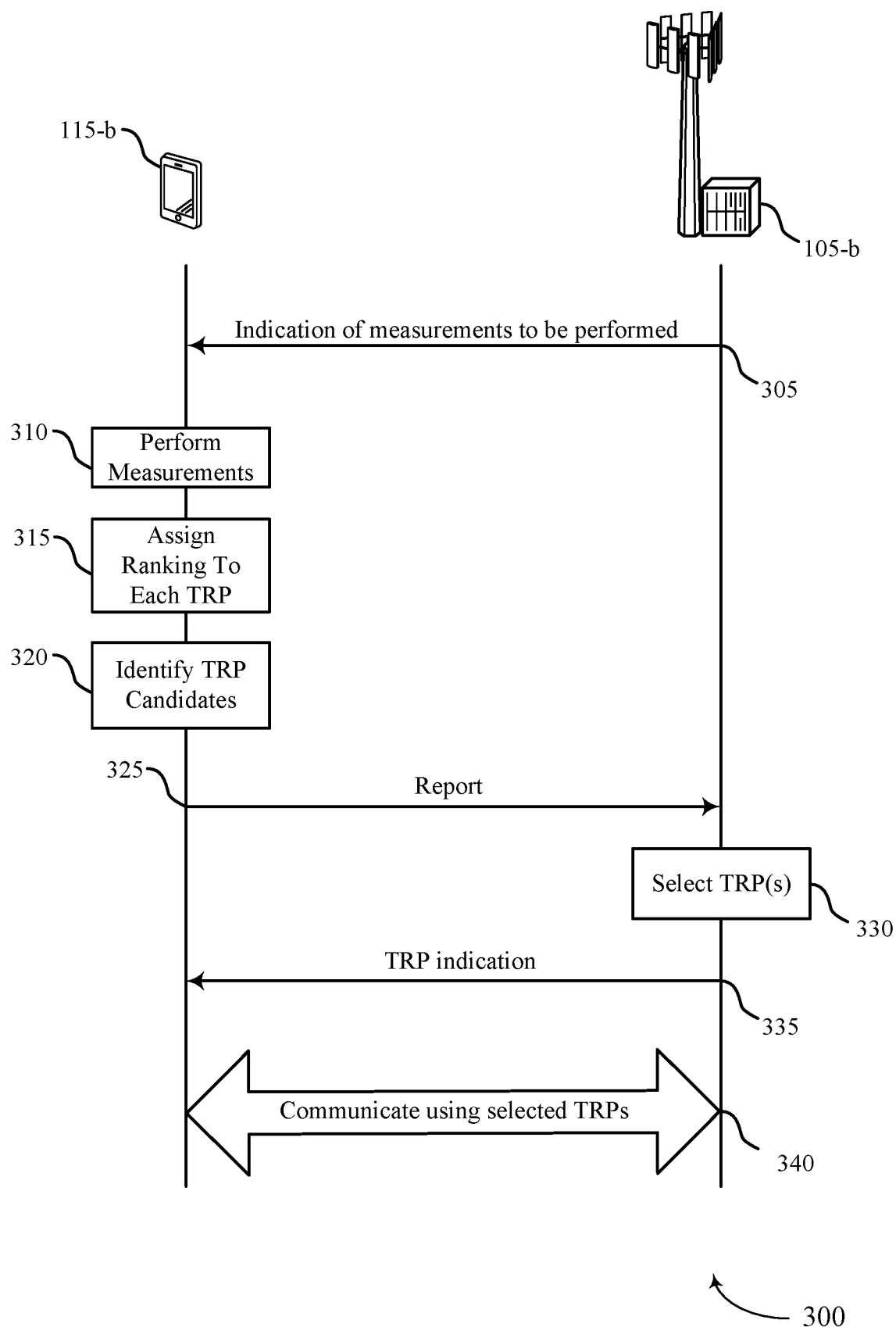
FIG. 3 illustrates an example of a process flow that supports multi-TRP candidate identification in accordance with aspects of the present disclosure.

FIG. 3 illustrates an example of a process flow 300 in a system that supports multi-TRP candidate identification in accordance with aspects of the present disclosure. In some examples, process flow 300 may implement aspects of wireless communication system 100 or wireless communication system 200. Process flow 300 includes a UE 115-*b* and base station 105-*b*, which may be examples of the corresponding devices as described with reference to FIGS. 1 and 2. Process flow 300 illustrates an example of multi-TRP candidate identification.

At 305, base station 105-*b* may transmit an indication of one or more measurements to be performed by the UE 115-*b* for communications between the UE 115-*b* and the base station 105-*b*. In some cases, the measurements may include an L3 measurement, an L1 measurement, or another measurement of signal quality. In some cases, the measurements may include a timing measurement or a capability measurement.

At 310, UE 115-*a* may perform the indicated one or more measurements on each TRP of a set of TRPs associated with base station 105-*b*.

At 315, optionally, UE 115-*a* may assign a ranking to each TRP of the set of TRPs. The ranking for each TRP may be based on the measurements for the TRP.

At 320, UE 115-*a* may identify one or more TRP candidates from the set of TRPs. UE 115-*a* may identify the TRP candidates based on the measurements associated with each TRP and/or based on the ranking for each TRP, for example.

At 325, UE 115-*a* may transmit, to base station 105-*b*, a report that is based on the measurements. The report may be associated with one or more TRP candidates, which may be the TRP candidates identified by UE 115-*a* at 320. In some cases, the report may include the measurements for the TRP candidates, and/or may include a device identifier associated with each of the TRP candidates. In some cases, the report may exclude measurements or device identifiers associated with TRPs in the set that have not been identified as TRP candidates.

At 330, base station 105*b* may select one or more TRPs from the TRP candidates based on the report. Base station 105*b* may select the TRP(s) based on measurements and/or rankings associated with the TRP candidates, for example.

At 335, base station 105*b* may transmit, to UE 115-*b*, a TRP indication that indicates the selected TRP(s). In some cases, the TRP indication may include device identifiers associated with the selected TRP(s). In some cases, the TRP indication may be signaled implicitly, via a CORESET identifier or TCI state, for example.

At 340, base station 105*b* and UE 115*b* may begin communicating via the selected TRPs.

Figure 4:
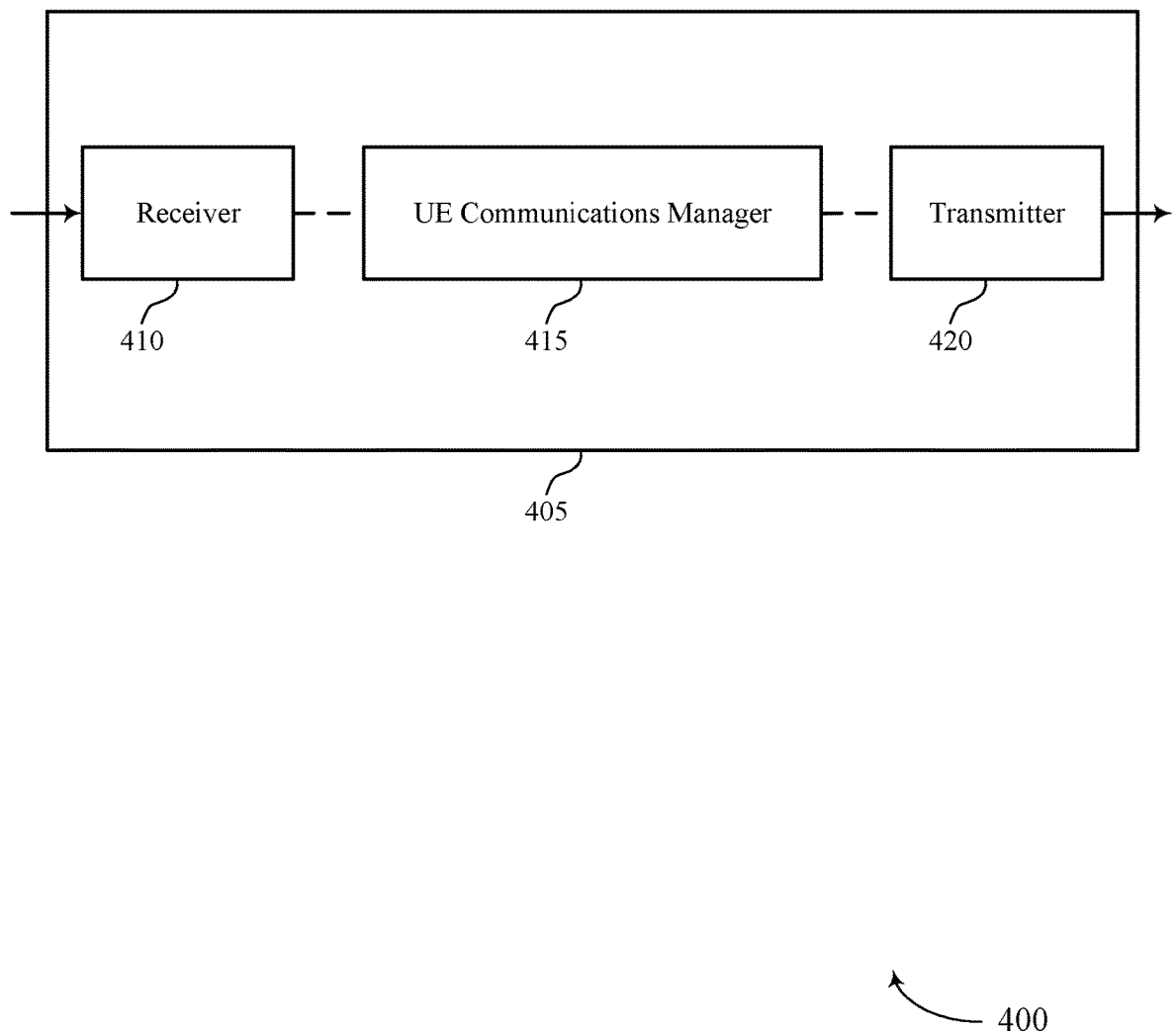
FIGS. 4 and 5 show block diagrams of devices that support multi-TRP candidate identification in accordance with aspects of the present disclosure.

FIG. 4 shows a block diagram 400 of a device 405 that supports multi-TRP candidate identification in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to multi-TRP candidate identification). Information may be passed on to other components of the device 405. The receiver 410 may be an example of aspects of the transceiver 720 described with reference to FIG. 7. The receiver 410 may utilize a single antenna or a set of antennas.

The UE communications manager 415 may receive, from a base station, an indication of one or more measurements to be performed by the UE for determination of TRP candidates for communications between the UE and the base station, perform, based on the indication, the one or more measurements on each TRP of a set of TRPs associated with the base station, and transmit, to the base station, a report based on the one or more measurements, the report being associated with one or more TRP candidates of the set of TRPs for communication with the UE. The UE communications manager 415 may be an example of aspects of the UE communications manager 710 described herein.

In some cases, the UE communications manager 415 may identify one or more measurements to be performed by the UE for determination of TRP candidates for communications between the UE and a set of TRPs associated with one or more base stations, perform, based on the identifying, the one or more measurements on each TRP of the set of TRPs associated with the one or more base stations, and transmit, to the one or more base stations, a report based on the one or more measurements, the report being associated with one or more TRP candidates of the set of TRPs for communication with the UE.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
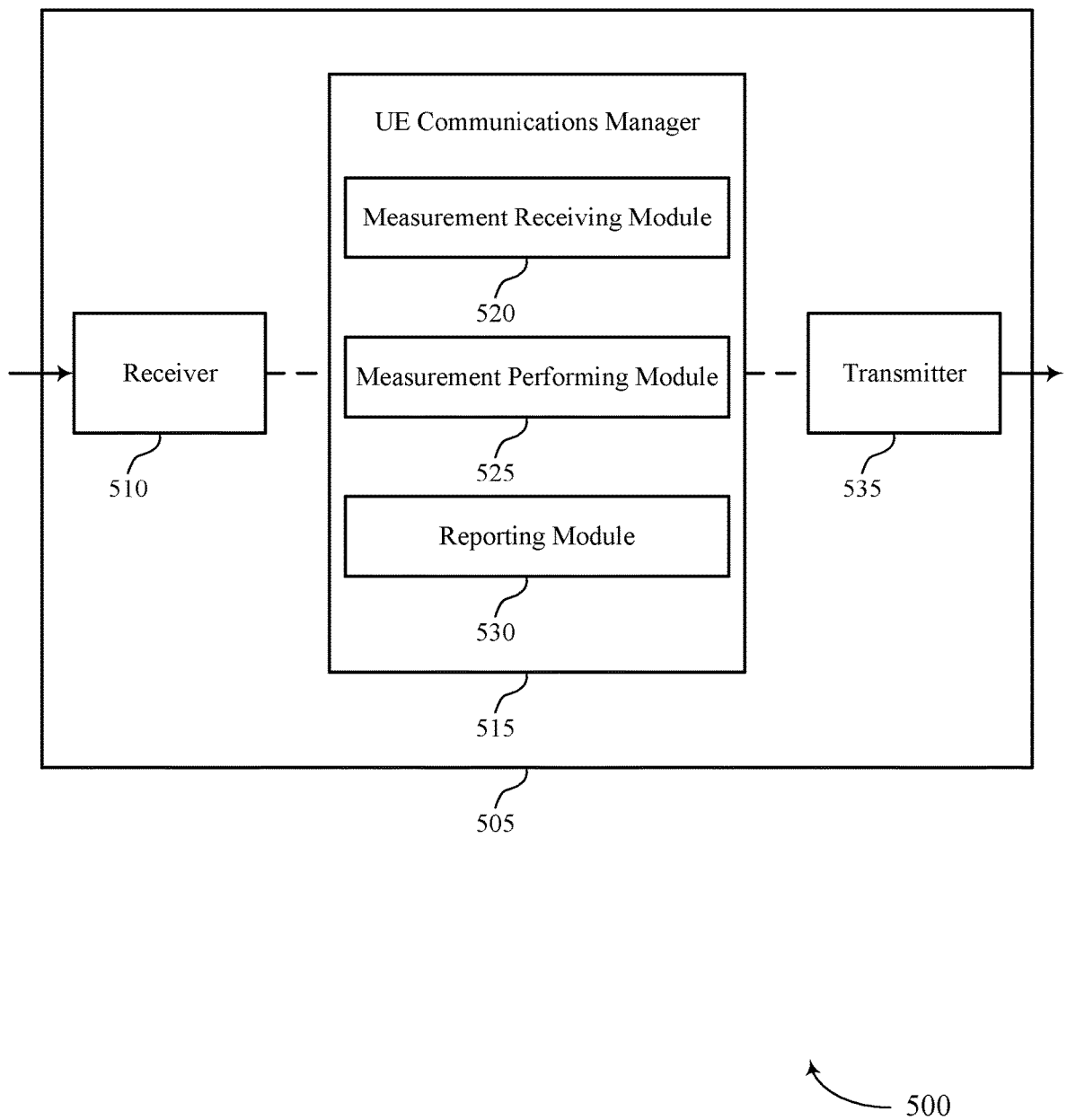

FIG. 5 shows a block diagram 500 of a device 505 that supports multi-TRP candidate identification in accordance with aspects of the present disclosure. The device 505 may be an example of aspects of a device 405, or a UE 115 as described herein. The device 505 may include a receiver 510, a UE communications manager 515, and a transmitter 535.

The device 505 may also include a processor. Each of these components may be in communication with one another (e.g., via one or more buses).

The receiver 510 may receive information such as packets, user data, or control information associated with various information channels (e.g., control channels, data channels, and information related to multi-TRP candidate identification). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a measurement receiving module 520, a measurement performing module 525, and a reporting module 530. The UE communications manager 515 may be an example of aspects of the UE communications manager 710 described herein.

The measurement receiving module 520 may receive, from a base station, an indication of one or more measurements to be performed by the UE for determination of TRP candidates for communications between the UE and the base station. The measurement performing module 525 may perform, based on the indication, the one or more measurements on each TRP of a set of TRPs associated with the base station. The reporting module 530 may transmit, to the base station, a report based on the one or more measurements, the report being associated with one or more TRP candidates of the set of TRPs for communication with the UE.

In some cases, the measurement receiving module 520 may identify one or more measurements to be performed by the UE for determination of TRP candidates for communications between the UE and a set of TRPs associated with one or more base stations. In some cases, the measurement performing module 525 may perform, based on the identifying, the one or more measurements on each TRP of the set of TRPs associated with the one or more base stations. In some cases, the reporting module 530 may transmit, to the one or more base stations, a report based on the one or more measurements, the report being associated with one or more TRP candidates of the set of TRPs for communication with the UE.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
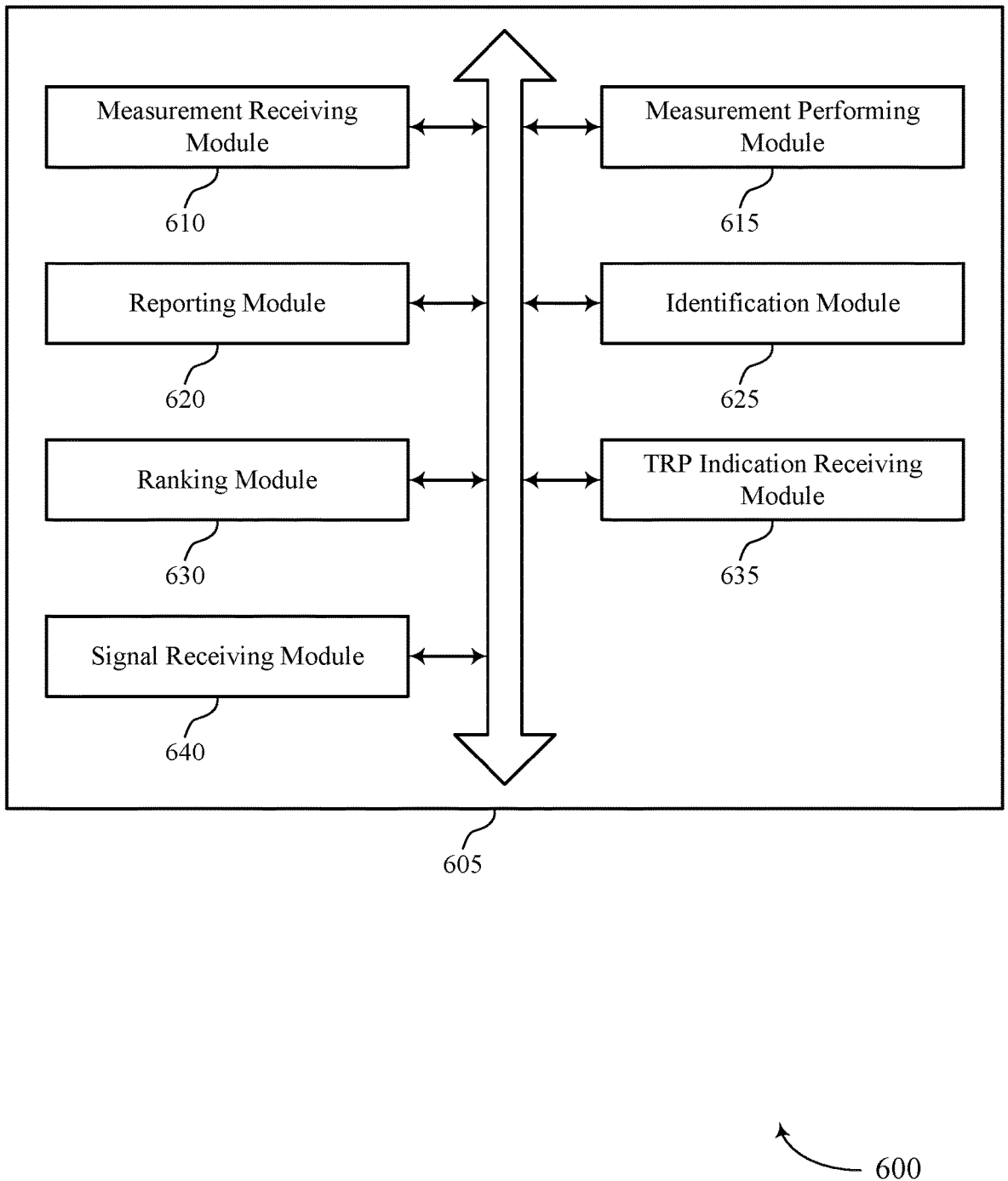
FIG. 6 shows a block diagram of a communications manager that supports multi-TRP candidate identification in accordance with aspects of the present disclosure.

FIG. 6 shows a block diagram 600 of a UE communications manager 605 that supports multi-TRP candidate identification in accordance with aspects of the present disclosure. The UE communications manager 605 may be an example of aspects of a UE communications manager 415, a UE communications manager 515, or a UE communications manager 710 described herein. The UE communications manager 605 may include a measurement receiving module 610, a measurement performing module 615, a reporting module 620, an identification module 625, a ranking module 630, a TRP indication receiving module 635, and a signal receiving module 640. Each of these modules may communicate, directly or indirectly, with one another (e.g., via one or more buses).

The measurement receiving module 610 may receive, from a base station, an indication of one or more measurements to be performed by the UE for determination of TRP candidates for communications between the UE and the base station. In some cases, the measurement receiving module 610 may identify one or more measurements to be performed by the UE for determination of TRP candidates for communications between the UE and a set of TRPs associated with one or more base stations. In some examples, the measurement receiving module 610 may receive the indication of the one or more measurements via RRC signaling. In some examples, the measurement receiving module 610 may receive the indication of the one or more measurements via a control message. In some examples, all TRPs of the set of TRPs are configured to communicate on a same carrier frequency. The indication of the one or more measurements may include an indication of a number of TRPs to identify as TRP candidates, where identifying the one or more TRP candidates includes identifying the number of TRP candidates.

In some examples, the measurement receiving module 610 may receive, from the base station, an indication of the set of TRPs associated with the base station. The measurement performing module 615 may perform, based on the indication, the one or more measurements on each TRP of a set of TRPs associated with the base station. In some cases, the measurement performing module 615 may perform, based on the identifying, the one or more measurements on each TRP of the set of TRPs associated with the one or more base stations.

In some examples, the measurement performing module 615 may perform an L3 measurement on each TRP. In some examples, the measurement performing module 615 may perform an L1 measurement on each TRP.

The reporting module 620 may transmit, to the one or more base stations, a report based on the one or more measurements, the report being associated with one or more TRP candidates of the set of TRPs for communication with the UE. In some examples, the reporting module 620 may transmit a list including the first set of TRP candidates and the second set of TRP candidates in an order based on the rankings associated with TRPs in the first set of TRP candidates and on the rankings associated with TRPs in the second set of TRP candidates. In some examples, the reporting module 620 may transmit one or more respective device identifiers associated with the one or more TRP candidates.

The identification module 625 may identify the one or more TRP candidates based on the one or more measurements. In some examples, the identification module 625 may identify the one or more TRP candidates based on one or more timings associated with the one or more TRPs. In some examples, transmissions from the one or more TRP candidates may be configured for simultaneous reception at the UE. In some examples, the identification module 625 may identify the one or more TRP candidates based on one or more timing differences between the one or more TRPs. In some examples, the identification module 625 may identify a second set of TRP candidates including the number of TRPs based on a ranking associated with each TRP.

The ranking module 630 may determine a ranking associated with each TRP of the set of TRPs, where the one or more TRP candidates are identified based on the ranking associated with each TRP. In some examples, the ranking module 630 may determine the ranking associated with each TRP based on the one or more measurements associated with each TRP. In some examples, the ranking module 630 may determine the ranking associated with each TRP based on a capability associated with each TRP.

The TRP indication receiving module 635 may receive, from the base station, a TRP indication indicating one or more selected TRPs of the one or more TRP candidates after transmitting the report. In some examples, the TRP indication receiving module 635 may receive one or more respective device identifiers associated with the one or more selected TRPs. In some examples, the TRP indication receiving module 635 may receive an indication of the one or more selected TRPs implicitly via a CORESET identifier or via a TCI state.

The signal receiving module 640 may receive, from the base station, a signal via at least one TRP of the one or more TRP candidates after transmitting the report.

Figure 7:
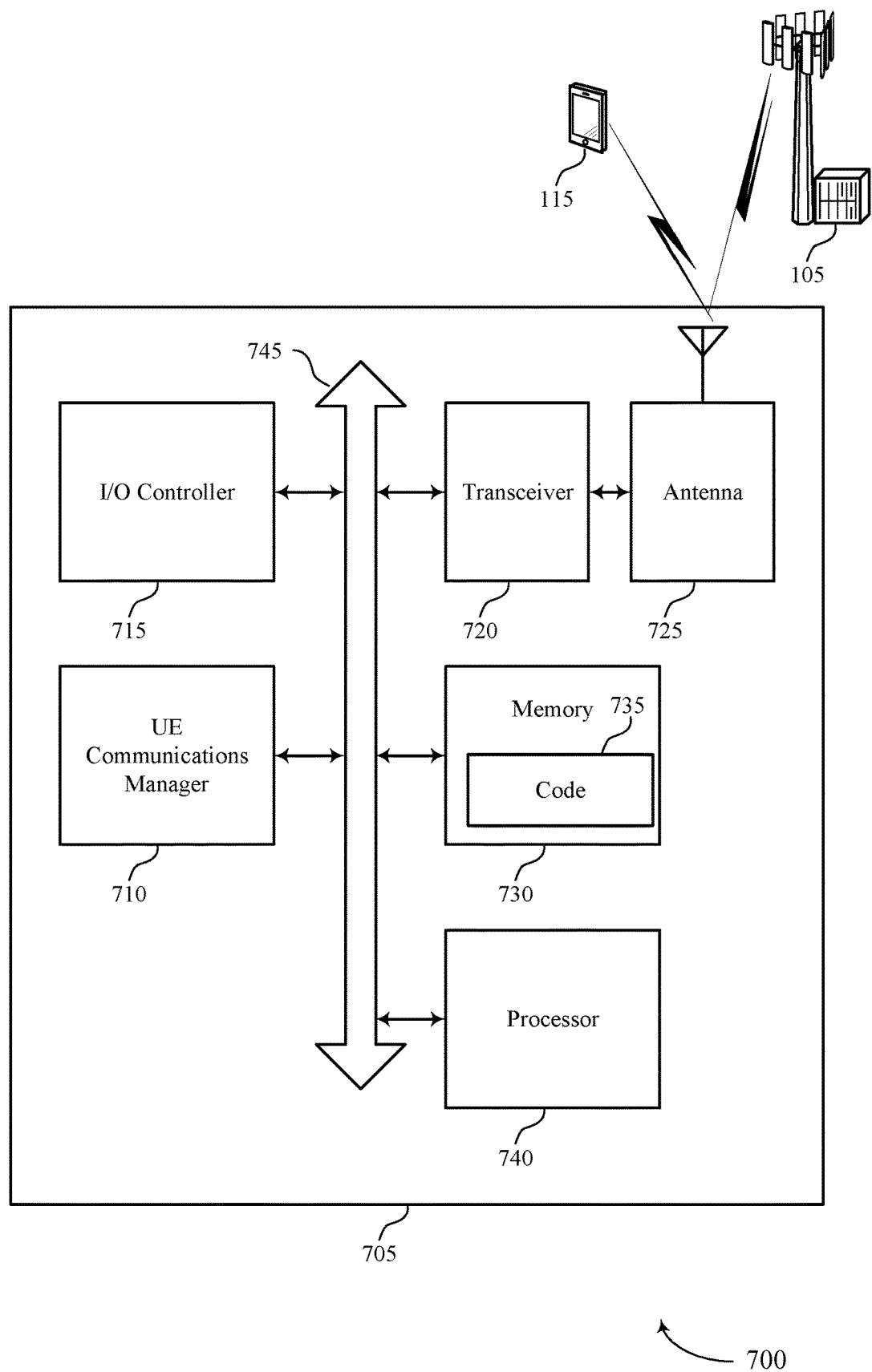
FIG. 7 shows a diagram of a system including a device that supports multi-TRP candidate identification in accordance with aspects of the present disclosure.

FIG. 7 shows a diagram of a system 700 including a device 705 that supports multi-TRP candidate identification in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may receive, from a base station, an indication of one or more measurements to be performed by the UE for determination of TRP candidates for communications between the UE and the base station, and perform, based on the indication, the one or more measurements on each TRP of a set of TRPs associated with the base station. The UE communications manager 710 may transmit, to the base station, a report based on the one or more measurements, the report being associated with one or more TRP candidates of the set of TRPs for communication with the UE.

In some cases, the UE communications manager 710 may identify one or more measurements to be performed by the UE for determination of TRP candidates for communications between the UE and a set of TRPs associated with one or more base stations, and perform, based on the identifying, the one or more measurements on each TRP of the set of TRPs associated with the one or more base stations. The UE communications manager 710 may transmit, to the one or more base stations, a report based on the one or more measurements, the report being associated with one or more TRP candidates of the set of TRPs for communication with the UE.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting multi-TRP candidate identification).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
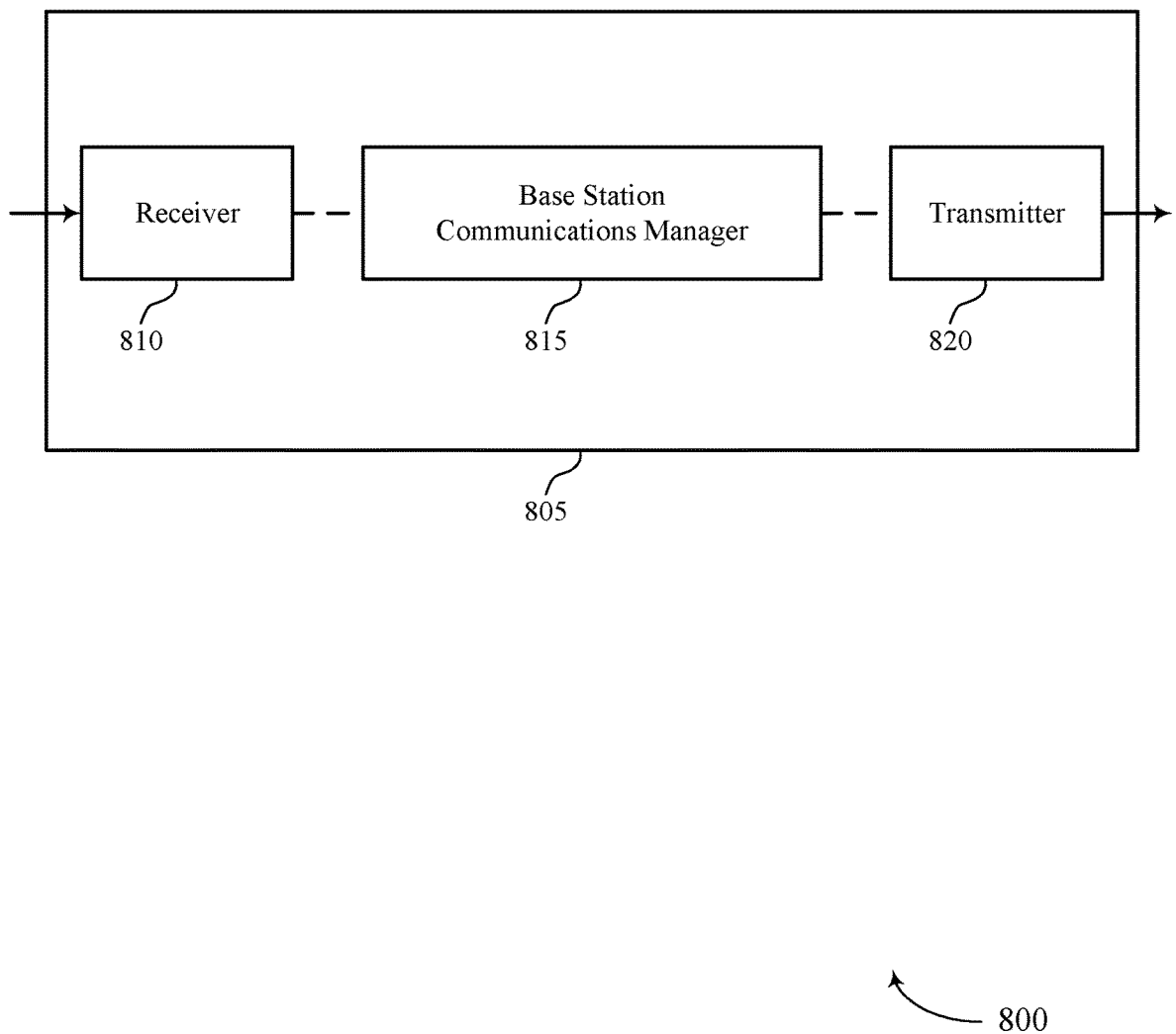
FIGS. 8 and 9 show block diagrams of devices that support multi-TRP candidate identification in accordance with aspects of the present disclosure.

FIG. 8 shows a block diagram 800 of a device 805 that supports multi-TRP candidate identification in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to multi-TRP candidate identification). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may transmit, to a UE, an indication of one or more measurements to be performed by the UE for communications between the UE and the base station, and receive, from the UE, a report based on the one or more measurements performed by the UE, the report being associated with one or more TRP candidates of a set of TRPs for communication with the UE. The base station communications manager 815 may select, based on the report, a TRP of the one or more TRP candidates for communication with the UE, and transmit, to the UE, a TRP indication indicating the selected TRP for communication with the UE. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
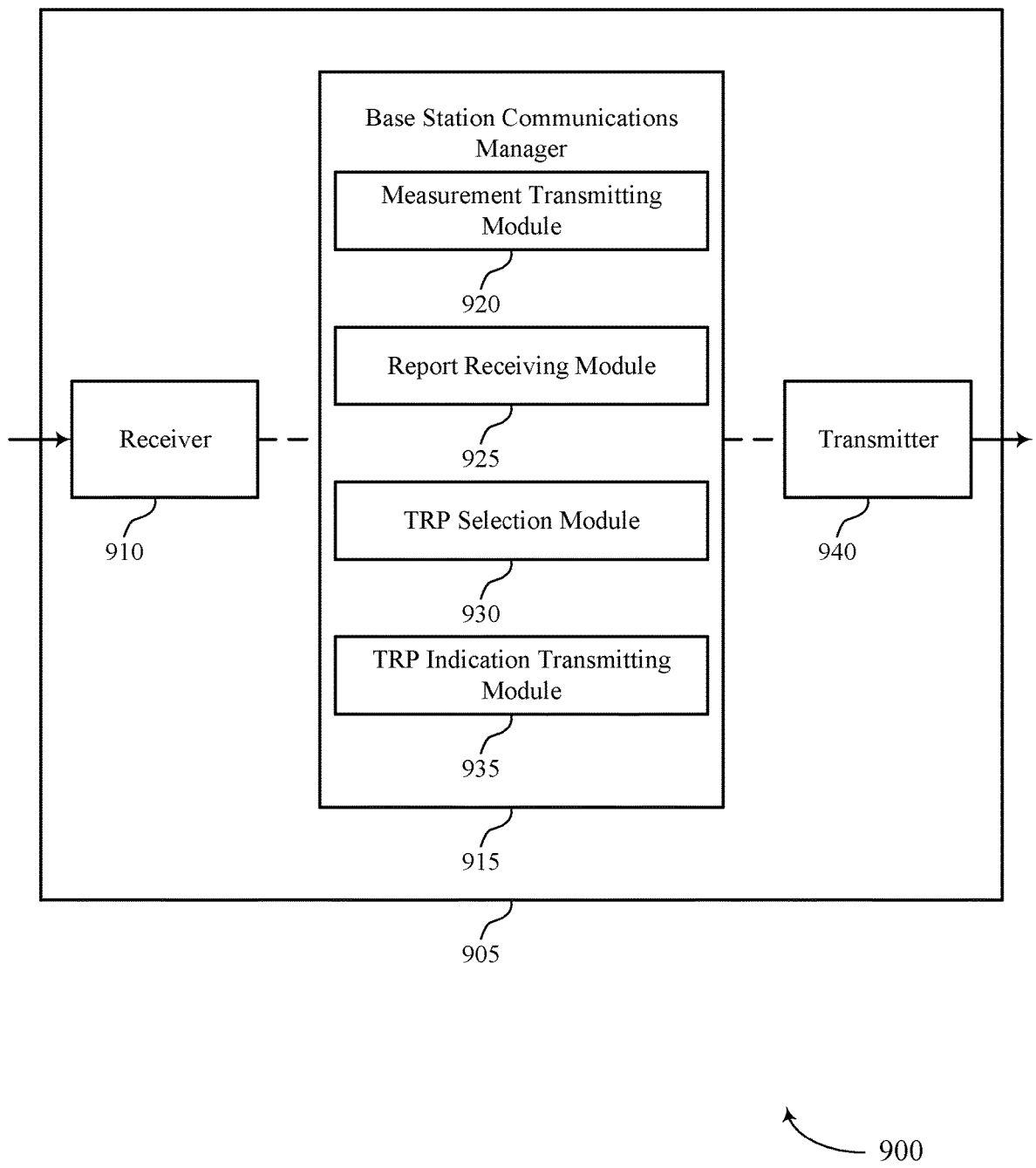

FIG. 9 shows a block diagram 900 of a device 905 that supports multi-TRP candidate identification in accordance with aspects of the present disclosure. The device 905 may be an example of aspects of a device 805, or a base station 105 as described herein. The device 905 may include a receiver 910, a base station communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to multi-TRP candidate identification). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a measurement transmitting module 920, a report receiving module 925, a TRP selection module 930, and a TRP indication transmitting module 935. The base station communications manager 915 may be an example of aspects of the base station communications manager 1110 described herein. The measurement transmitting module 920 may transmit, to a UE, an indication of one or more measurements to be performed by the UE for communications between the UE and the base station.

The report receiving module 925 may receive, from the UE, a report based on the one or more measurements performed by the UE, the report being associated with one or more TRP candidates of a set of TRPs for communication with the UE. The TRP selection module 930 may select, based on the report, a TRP of the one or more TRP candidates for communication with the UE. The TRP indication transmitting module 935 may transmit, to the UE, a TRP indication indicating the selected TRP for communication with the UE.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
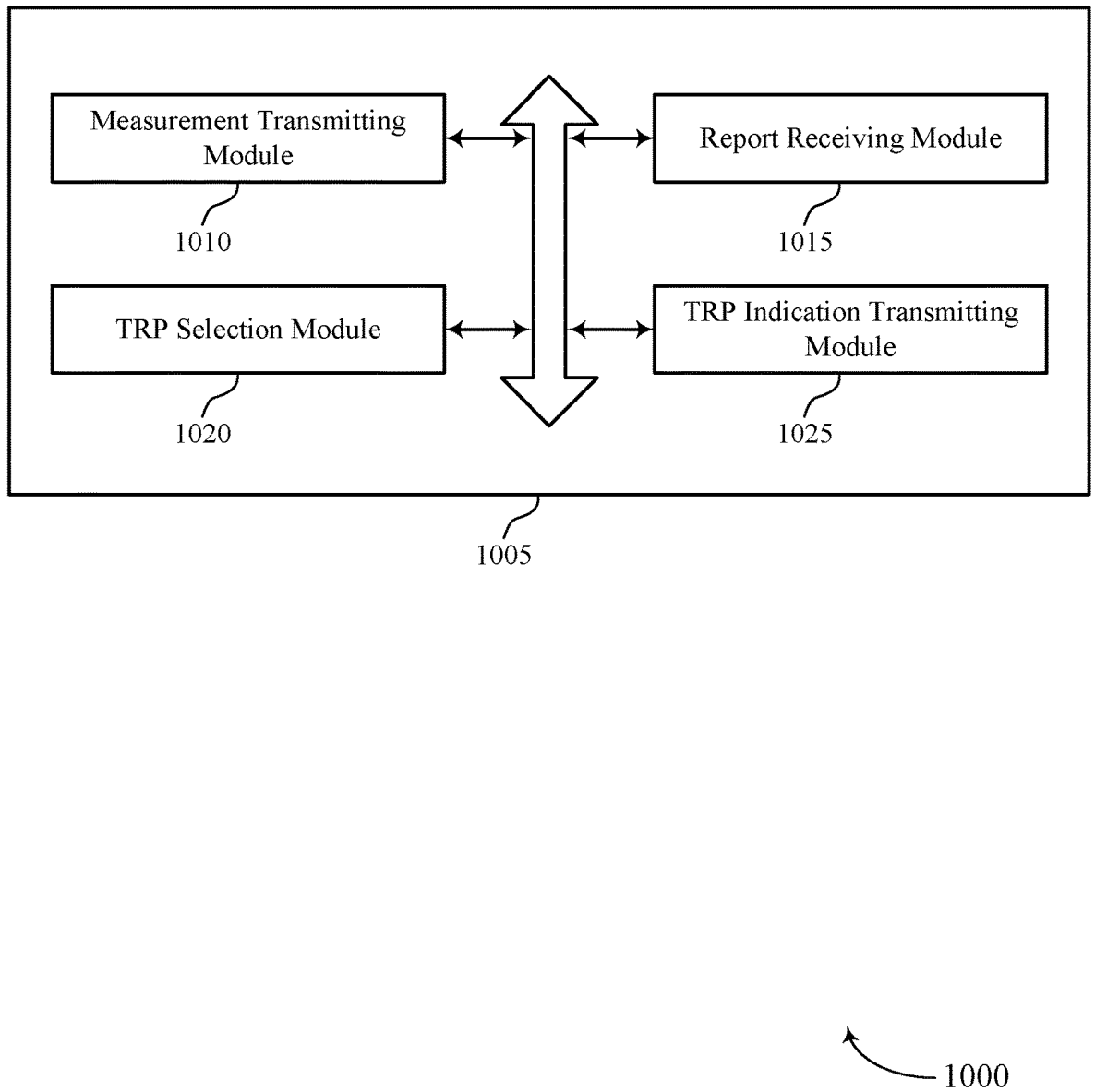
FIG. 10 shows a block diagram of a communications manager that supports multi-TRP candidate identification in accordance with aspects of the present disclosure.

FIG. 10 shows a block diagram 1000 of a base station communications manager 1005 that supports multi-TRP candidate identification in accordance with aspects of the present disclosure. The base station communications manager 1005 may be an example of aspects of a base station communications manager 815, a base station communications manager 915, or a base station communications manager 1110 described herein. The base station communications manager 1005 may include a measurement transmitting module 1010, a report receiving module 1015, a TRP selection module 1020, and a TRP indication transmitting module 1025. Each of these modules may communicate, directly or indirectly, with one another (e.g., via one or more buses).

The measurement transmitting module 1010 may transmit, to a UE, an indication of one or more measurements to be performed by the UE for communications between the UE and the base station. In some examples, the measurement transmitting module 1010 may transmit, to the UE, an indication of the set of TRPs on which the one or more measurements are to be performed.

In some examples, the measurement transmitting module 1010 may transmit an indication of a number of TRPs to identify as TRP candidates, where the one or more TRP candidates includes the number of TRP candidates. In some examples, the measurement transmitting module 1010 may transmit an indication of a timing measurement. In some examples, the measurement transmitting module 1010 may transmit an indication of a signal quality measurement. In some examples, the measurement transmitting module 1010 may transmit an indication of a TRP capability. In some examples, the measurement transmitting module 1010 may transmit the indication of the one or more measurements via RRC signaling. In some examples, the measurement transmitting module 1010 may transmit the indication of the one or more measurements via a control message.

In some examples, all TRPs of the set of TRPs are configured to communicate on a same carrier frequency.

The report receiving module 1015 may receive, from the UE, a report based on the one or more measurements performed by the UE, the report being associated with one or more TRP candidates of a set of TRPs for communication with the UE. In some examples, the report may include a ranking for each TRP of the one or more TRP candidates, where selecting a TRP for communication with the UE includes selecting the TRP based on the ranking associated with each TRP of the one or more TRPs.

The TRP selection module 1020 may select, based on the report, a TRP of the one or more TRP candidates for communication with the UE. In some examples, the TRP selection module 1020 may select at least two of the two or more TRP candidates based on the report, where the TRP indication indicates the at least two selected TRPs for communication with the UE. The TRP indication transmitting module 1025 may transmit, to the UE, a TRP indication indicating the selected TRP for communication with the UE.

Figure 11:
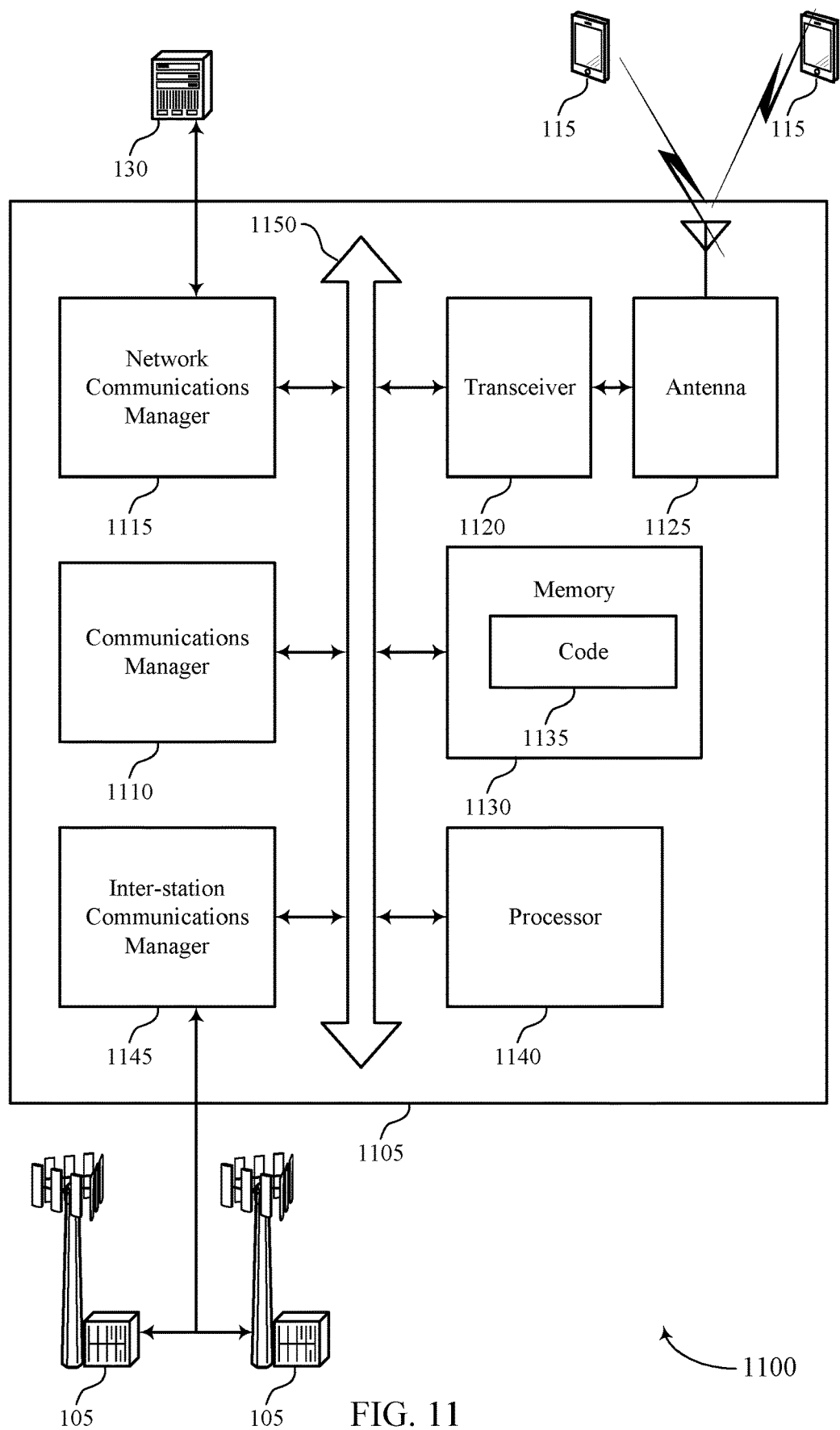
FIG. 11 shows a diagram of a system including a device that supports multi-TRP candidate identification in accordance with aspects of the present disclosure.

FIG. 11 shows a diagram of a system 1100 including a device 1105 that supports multi-TRP candidate identification in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network base station communications manager 1115, a transceiver 1120, an antenna 1125, memory 1130, a processor 1140, and an inter-station base station communications manager 1145. These components may be in electronic communication via one or more buses (e.g., bus 1150).

The base station communications manager 1110 may transmit, to a UE, an indication of one or more measurements to be performed by the UE for communications between the UE and the base station, and receive, from the UE, a report based on the one or more measurements performed by the UE, the report being associated with one or more TRP candidates of a set of TRPs for communication with the UE. The base station communications manager 1110 may select, based on the report, a TRP of the one or more TRP candidates for communication with the UE, and transmit, to the UE, a TRP indication indicating the selected TRP for communication with the UE.

The network base station communications manager 1115 may manage communications with the core network (e.g., via one or more wired backhaul links). For example, the network base station communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting multi-TRP candidate identification).

The inter-station base station communications manager 1145 may manage communications with other base station 105, and may include a controller or scheduler for controlling communications with UEs 115 in cooperation with other base stations 105. For example, the inter-station base station communications manager 1145 may coordinate scheduling for transmissions to UEs 115 for various interference mitigation techniques such as beamforming or joint transmission. In some examples, the inter-station base station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
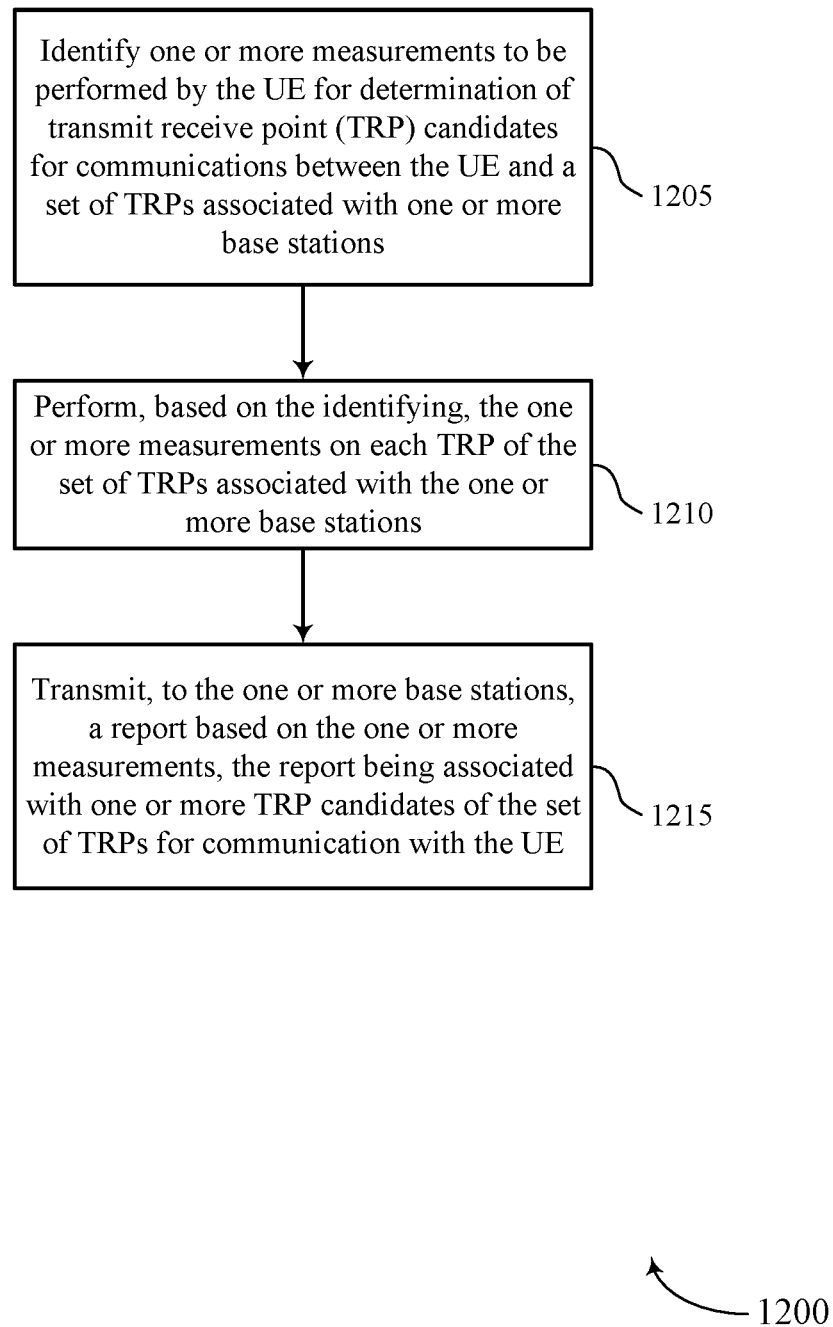
FIGS. 12 and 13 show flowcharts illustrating methods that support multi-TRP candidate identification in accordance with aspects of the present disclosure.

FIG. 12 shows a flowchart illustrating a method 1200 that supports multi-TRP candidate identification in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may identify one or more measurements to be performed by the UE for determination of TRP candidates for communications between the UE and a set of TRPs associated with one or more base stations. The operations of 1205 may be performed according to the methods described herein. In some examples, aspects of the operations of 1205 may be performed by a measurement receiving module as described with reference to FIGS. 4 through 7.

At 1210, the UE may perform, based on the identifying, the one or more measurements on each TRP of the set of TRPs associated with the one or more base stations. The operations of 1210 may be performed according to the methods described herein. In some examples, aspects of the operations of 1210 may be performed by a measurement performing module as described with reference to FIGS. 4 through 7.

At 1215, the UE may transmit, to the one or more base stations, a report based on the one or more measurements, the report being associated with one or more TRP candidates of the set of TRPs for communication with the UE. The operations of 1215 may be performed according to the methods described herein. In some examples, aspects of the operations of 1215 may be performed by a reporting module as described with reference to FIGS. 4 through 7.

Figure 13:
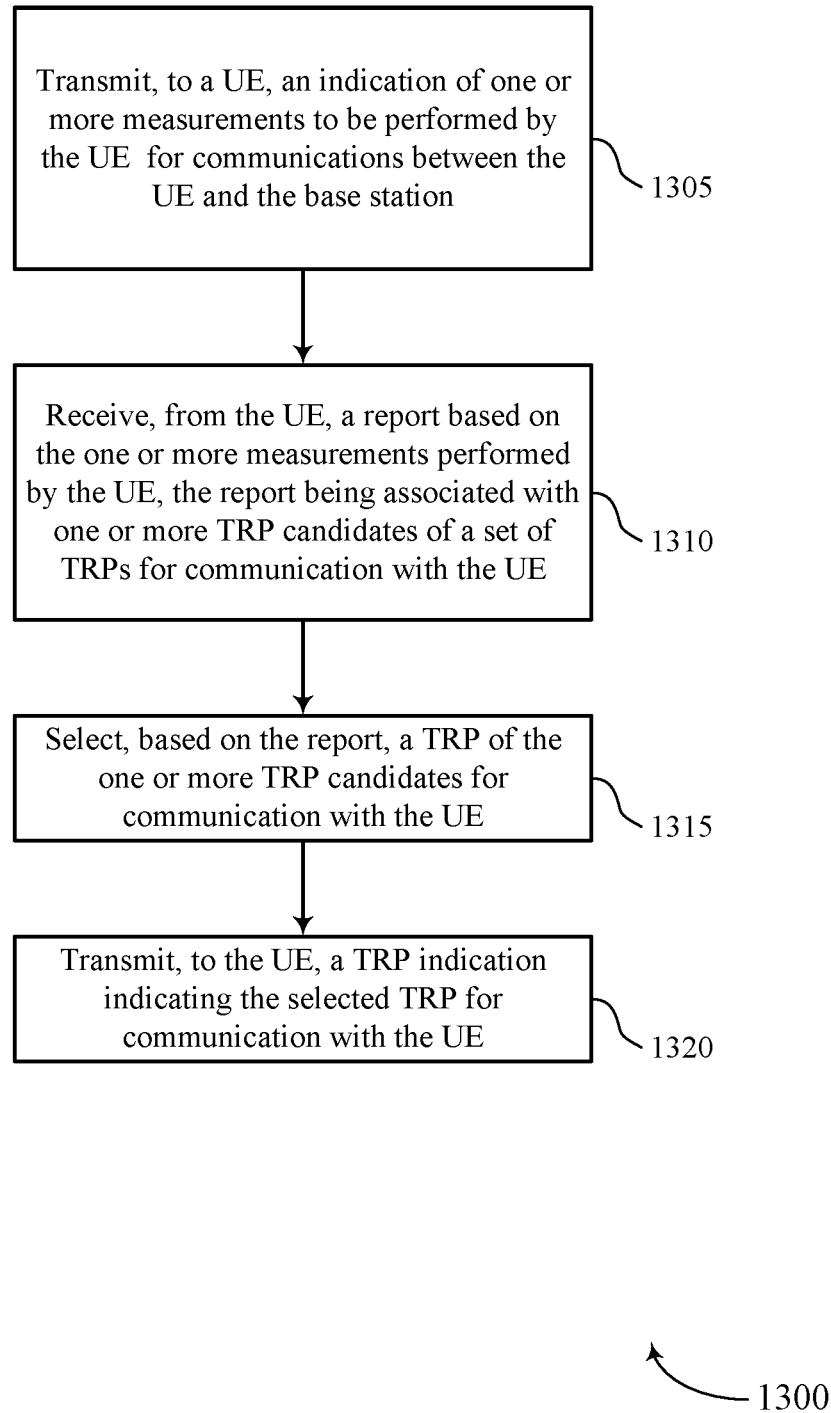

FIG. 13 shows a flowchart illustrating a method 1300 that supports multi-TRP candidate identification in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1305, the base station may transmit, to a UE, an indication of one or more measurements to be performed by the UE for communications between the UE and the base station. The operations of 1305 may be performed according to the methods described herein. In some examples, aspects of the operations of 1305 may be performed by a measurement transmitting module as described with reference to FIGS. 8 through 11.

At 1310, the base station may receive, from the UE, a report based on the one or more measurements performed by the UE, the report being associated with one or more TRP candidates of a set of TRPs for communication with the UE. The operations of 1310 may be performed according to the methods described herein. In some examples, aspects of the operations of 1310 may be performed by a report receiving module as described with reference to FIGS. 8 through 11.

At 1315, the base station may select, based on the report, a TRP of the one or more TRP candidates for communication with the UE. The operations of 1315 may be performed according to the methods described herein. In some examples, aspects of the operations of 1315 may be performed by a TRP selection module as described with reference to FIGS. 8 through 11.

At 1320, the base station may transmit, to the UE, a TRP indication indicating the selected TRP for communication with the UE. The operations of 1320 may be performed according to the methods described herein. In some examples, aspects of the operations of 1320 may be performed by a TRP indication transmitting module as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd GeneSXPration Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

receiving, from a base station, an indication requesting one or more signal characteristics be measured by the UE for determination of transmit receive point (TRP) candidates for communications between the UE and a plurality of TRPs associated with one or more base stations, wherein at least one signal characteristic of the one or more signal characteristics is associated with signal quality, signal timing, or both;

measuring, based at least in part on the indication, the one or more signal characteristics on each TRP of the plurality of TRPs associated with the one or more base stations;

transmitting, to the one or more base stations, a report based at least in part on the one or more signal characteristics, the report being associated with one or more TRP candidates of the plurality of TRPs for communication with the UE; and receiving, from the base station and responsive to the report, a TRP indication that indicates one or more selected TRPs of the one or more TRP candidates for the communications.

2. The method of claim 1, further comprising:

identifying the one or more TRP candidates based at least in part on the one or more signal characteristics.

3. The method of claim 2, wherein identifying the one or more TRP candidates based at least in part on the one or more signal characteristics comprises:

identifying the one or more TRP candidates based at least in part on one or more timings associated with one or more TRPs of the plurality of TRPs.

4. The method of claim 2, wherein transmissions from the one or more TRP candidates are configured for simultaneous reception at the UE.

5. The method of claim 4, wherein identifying the one or more TRP candidates based at least in part on the one or more signal characteristics comprises:

identifying the one or more TRP candidates based at least in part on one or more timing differences between one or more TRPs of the plurality of TRPs.

6. The method of claim 2, further comprising:

determining a ranking associated with each TRP of the plurality of TRPs, wherein the one or more TRP candidates are identified based at least in part on the ranking associated with each TRP.

7. The method of claim 6, wherein determining the ranking associated with each TRP comprises:

determining the ranking associated with each TRP based at least in part on the one or more signal characteristics associated with each TRP.

8. The method of claim 6, wherein determining the ranking associated with each TRP comprises:

determining the ranking associated with each TRP based at least in part on a capability associated with each TRP.

9. The method of claim 6, further comprising:

receiving, from the base station, an indicator of a number of TRPs to identify as TRP candidates, wherein identifying the one or more TRP candidates comprises identifying a first set of TRP candidates comprising the number of TRPs based at least in part on the ranking associated with each TRP.

10. The method of claim 9, wherein identifying the one or more TRP candidates comprises:

identifying a second set of TRP candidates comprising the number of TRPs based at least in part on the ranking associated with each TRP.

11. The method of claim 10, wherein transmitting the report comprises:

transmitting a list comprising the first set of TRP candidates and the second set of TRP candidates in an order based on the rankings associated with TRPs in the first set of TRP candidates and on the rankings associated with TRPs in the second set of TRP candidates.

12. The method of claim 1, wherein transmitting the report comprises:

transmitting one or more respective device identifiers associated with the one or more TRP candidates.

13. The method of claim 1, wherein receiving the indication of the one or more signal characteristics to be measured by the UE comprises:

receiving the indication of the one or more signal characteristics via radio resource control (RRC) signaling.

14. The method of claim 1, wherein receiving the indication of the one or more signal characteristics to be measured by the UE comprises:

receiving the indication of the one or more signal characteristics via a control message.

15. The method of claim 1, wherein measuring the one or more signal characteristics on each TRP comprises:

measuring an L3 signal characteristic on each TRP.

16. The method of claim 1, wherein measuring the one or more signal characteristics on each TRP comprises:

measuring an L1 signal characteristic on each TRP.

17. The method of claim 1, further comprising:

receiving, from the base station, an indicator of the plurality of TRPs associated with the base station.

18. The method of claim 1, wherein receiving the TRP indication comprises:

receiving one or more respective device identifiers associated with the one or more selected TRPs.

19. A method for wireless communications at a base station, comprising:

transmitting, to a user equipment (UE), an indication requesting one or more signal characteristics be measured by the UE for communications between the UE and the base station, wherein at least one signal characteristic of the one or more signal characteristics is associated with signal quality, signal timing, or both;

receiving, from the UE, a report based at least in part on the one or more signal characteristics measured by the UE, the report being associated with one or more transmit receive point (TRP) candidates of a plurality of TRPs for communication with the UE;

selecting, based at least in part on the report, a TRP of the one or more TRP candidates for communication with the UE; and transmitting, to the UE and in response to receiving the report, a TRP indication that indicates the selected TRP for communication with the UE.

20. The method of claim 19, wherein the one or more TRP candidates comprises two or more TRP candidates, the method further comprising:

selecting at least two of the two or more TRP candidates based at least in part on the report, wherein the TRP indication indicates the at least two selected TRPs for communication with the UE.

21. The method of claim 19, wherein receiving the report comprises:

receiving a ranking for each TRP of the one or more TRP candidates, and wherein selecting the TRP for communication with the UE comprises selecting the TRP based at least in part on the ranking associated with each TRP of one or more TRPs of the plurality of TRPs.

22. The method of claim 19, further comprising:
transmitting, to the UE, an indicator of the plurality of TRPs on which the one or more signal characteristics are to be measured.

23. The method of claim 19, further comprising:
transmitting, to the UE, an indicator of a number of TRPs to identify as TRP candidates, wherein the one or more TRP candidates comprises the number of TRP candidates.

24. The method of claim 19, wherein transmitting the indication of the one or more signal characteristics comprises:
transmitting an indicator of a timing signal characteristic.

25. The method of claim 19, wherein transmitting the indication of the one or more signal characteristics comprises:
transmitting an indicator of a signal quality characteristic.

26. The method of claim 19, wherein transmitting the indication of the one or more signal characteristics comprises:
transmitting an indicator of a TRP capability.

27. The method of claim 19, wherein transmitting the indication of the one or more signal characteristics comprises:
transmitting the indication of the one or more signal characteristics via radio resource control (RRC) signaling.

28. An apparatus for wireless communications at a user equipment (UE), comprising:
a processor,
memory coupled with the processor; and
instructions stored in the memory and executable by the processor to cause the apparatus to:
receive, from a base station, an indication requesting one or more signal characteristics be measured by the UE for determination of transmit receive point (TRP) candidates for communications between the UE and a plurality of TRPs associated with one or more base stations, wherein at least one signal characteristic of the one or more signal characteristics is associated with signal quality, signal timing, or both;
measure, based at least in part on the indication, the one or more signal characteristics on each TRP of the plurality of TRPs associated with the one or more base stations;
transmit, to the one or more base stations, a report based at least in part on the one or more signal characteristics, the report being associated with one or more TRP candidates of the plurality of TRPs for communication with the UE; and
receive, from the base station and responsive to the report, a TRP indication that indicates one or more selected TRPs of the one or more TRP candidates for the communications.

29. An apparatus for wireless communications at a base station, comprising:
a processor,
memory coupled with the processor; and
instructions stored in the memory and executable by the processor to cause the apparatus to:
transmit, to a user equipment (UE), an indication requesting one or more signal characteristics be measured by the UE for communications between the UE and the base station, wherein at least one signal characteristic of the one or more signal characteristics is associated with signal quality, signal timing, or both;
receive, from the UE, a report based at least in part on the one or more signal characteristics measured by the UE, the report being associated with one or more transmit receive point (TRP) candidates of a plurality of TRPs for communication with the UE;
select, based at least in part on the report, a TRP of the one or more TRP candidates for communication with the UE; and
transmit, to the UE and in response to receiving the report, a TRP indication that indicates the selected TRP for communication with the UE.

* * * * *